Jan. 24, 1939.　　　A. T. BODLE　　　2,145,150
POWER SHIFTER
Filed July 9, 1936　　　5 Sheets-Sheet 1

Inventor:-
Alexander T. Bodle,
By: Wilson, Dowell, McCanna & Foley Attys.

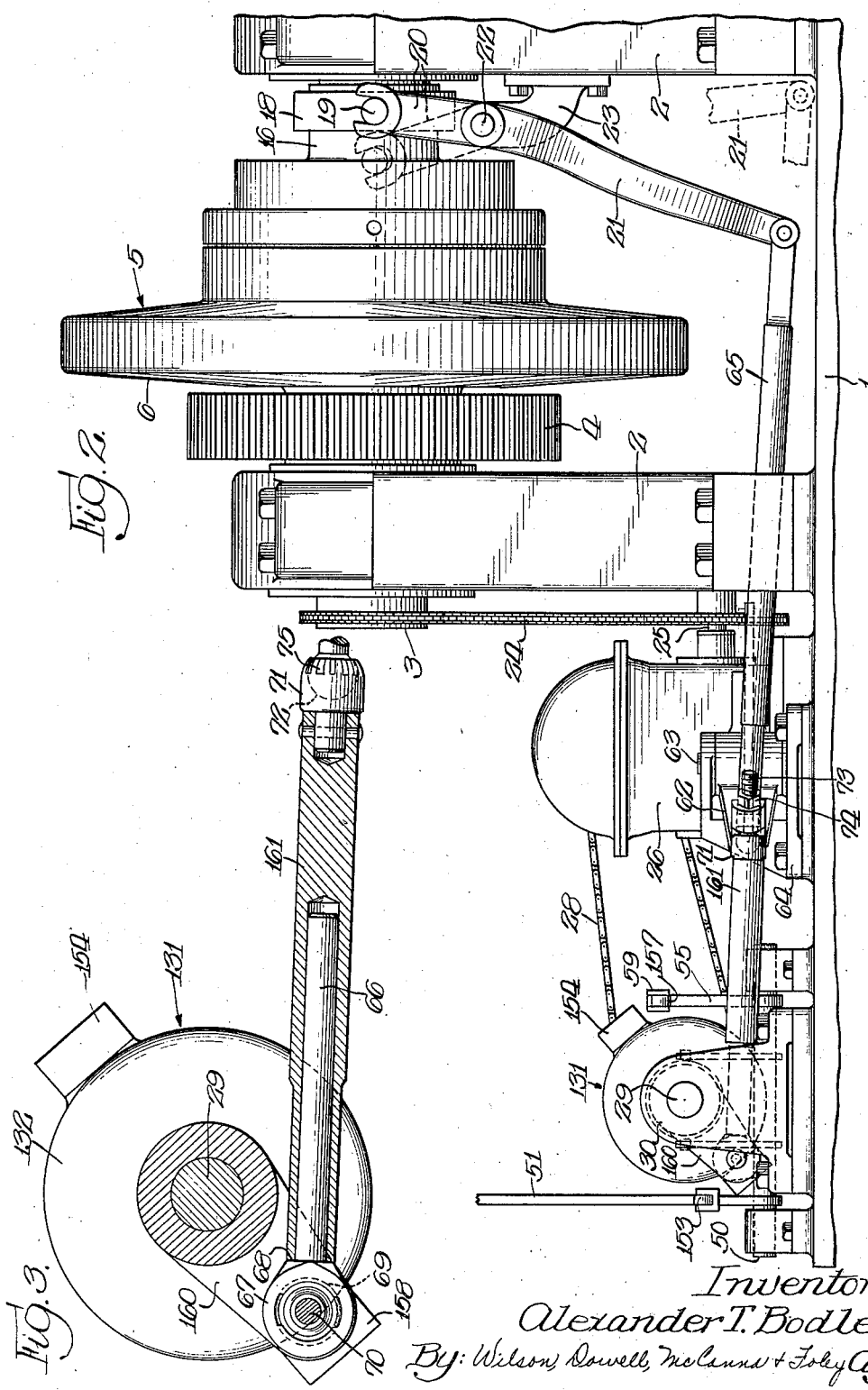

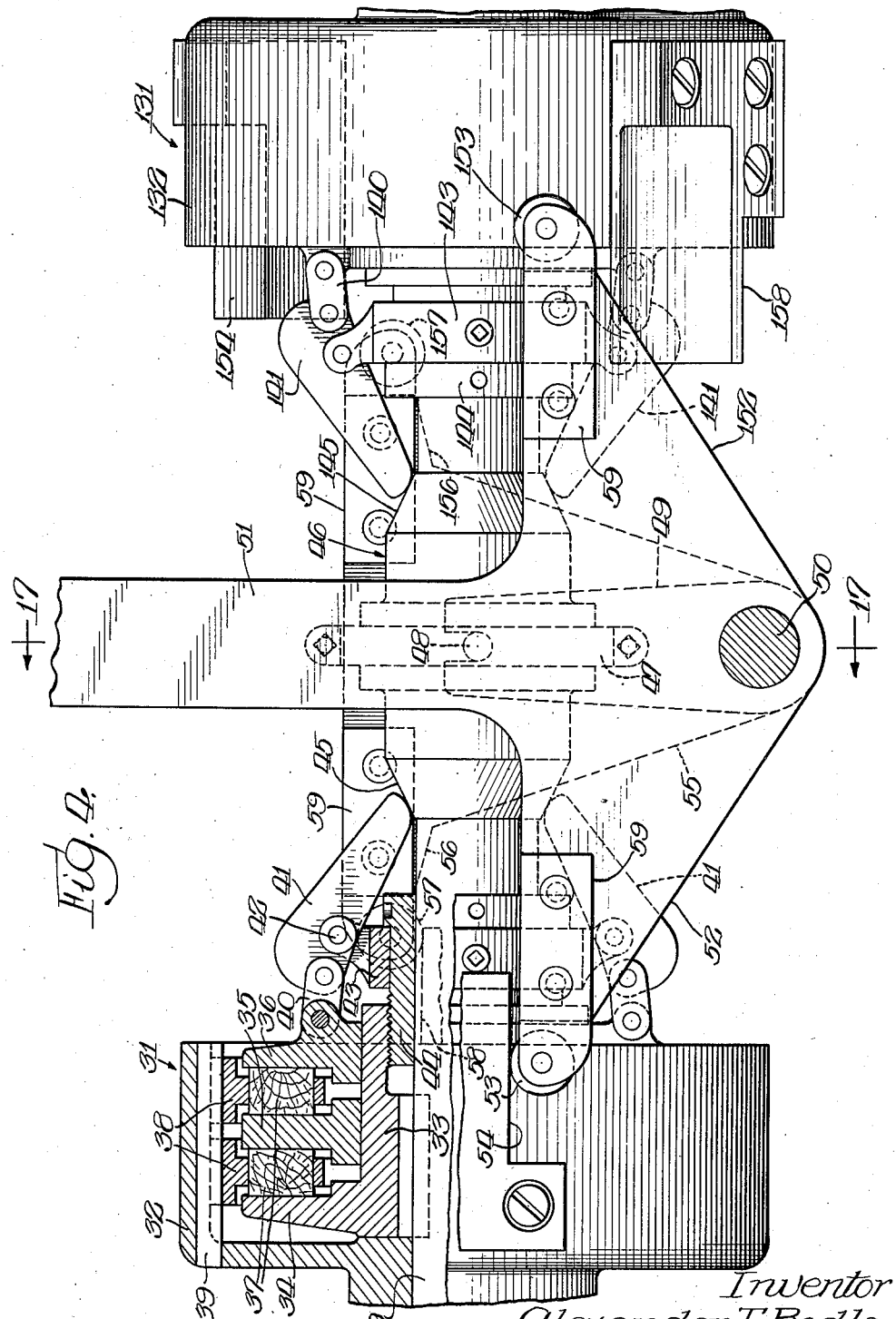

Jan. 24, 1939.  A. T. BODLE  2,145,150
POWER SHIFTER
Filed July 9, 1936  5 Sheets-Sheet 4
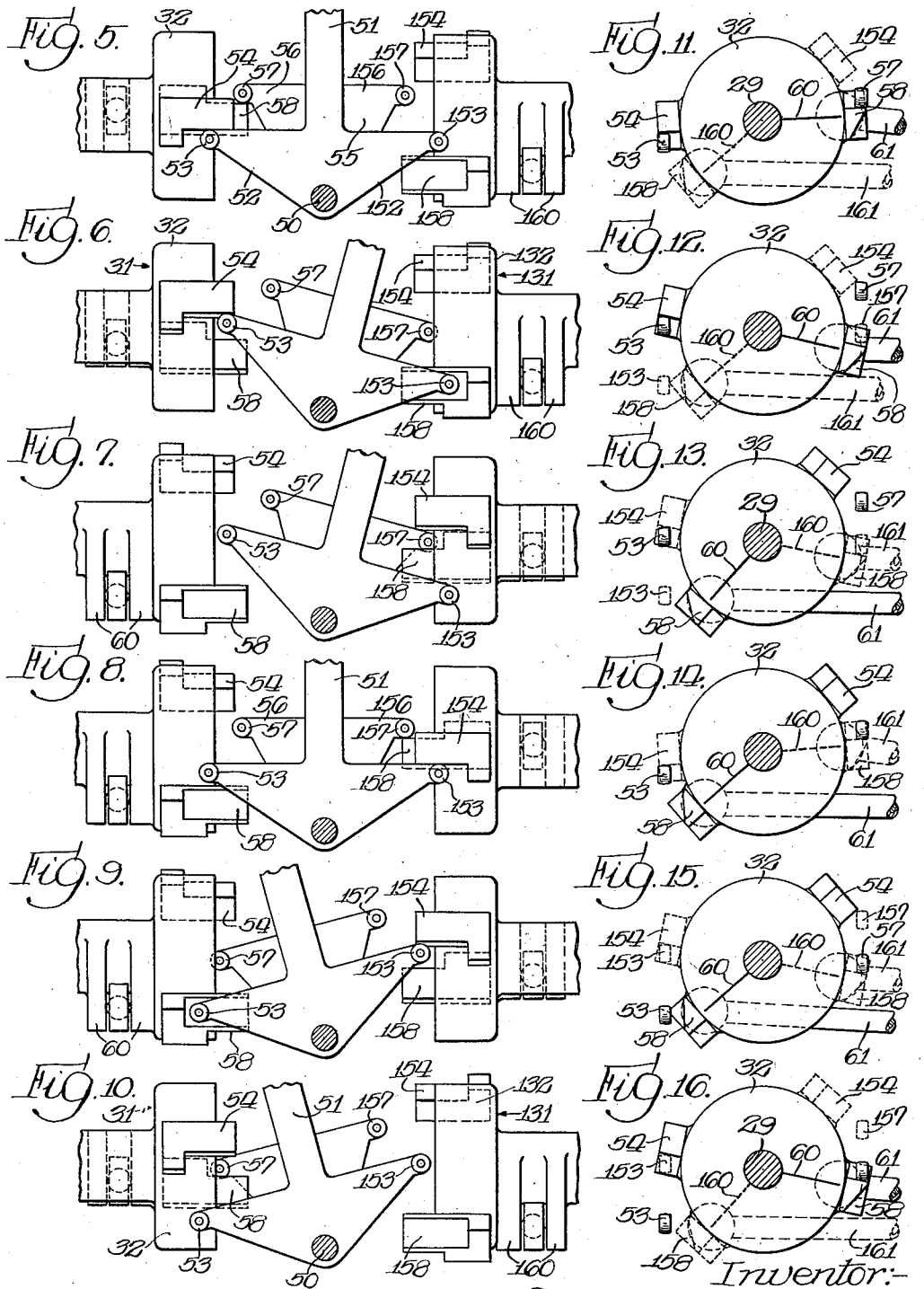

Jan. 24, 1939.  A. T. BODLE  2,145,150
POWER SHIFTER
Filed July 9, 1936  5 Sheets-Sheet 5
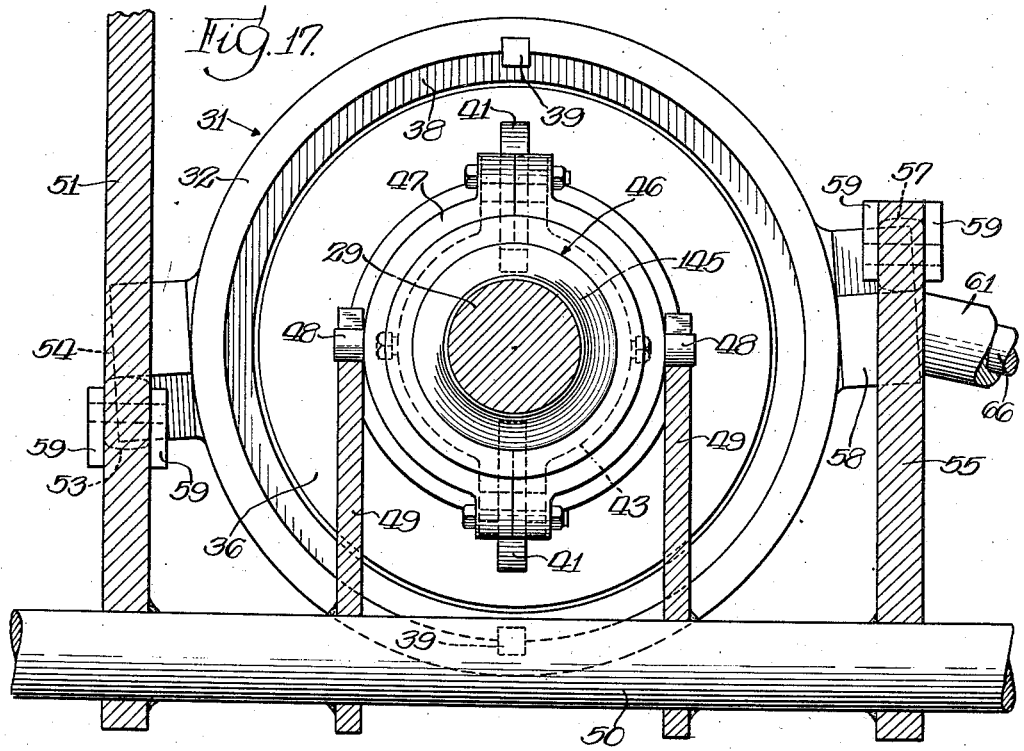
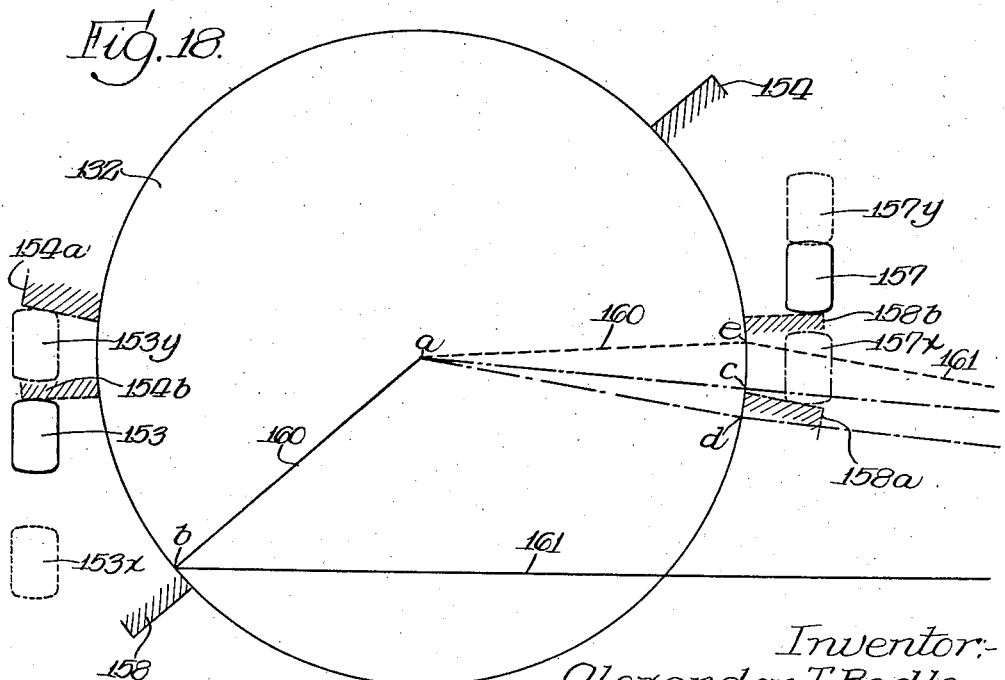
Inventor:-
Alexander T. Bodle,
By: Wilson, Dowell, McCamia & Foley Attys.

Patented Jan. 24, 1939

2,145,150

UNITED STATES PATENT OFFICE 2,145,150

POWER SHIFTER

Alexander T. Bodle, Mishawaka, Ind., assignor to Dodge Manufacturing Corporation, Mishawaka, Ind., a corporation of Indiana Application July 9, 1936, Serial No. 89,760

44 Claims. (Cl. 192—35)

My invention pertains to a mechanism for performing reverse shifting operations by application of motive power, having in view more particularly the shifting of large friction clutches.

The shifting of large friction clutches by manual operation of clutch throw levers requires vigorous effort, which in some instance may be so severe as to impose undue strains upon machine tenders. For example, large friction clutches used in heavy duty power transmission machinery are sometimes so difficult to operate that machine tenders must brace themselves and with both arms push or pull on the clutch levers with all their might and main or even swing themselves bodily against the clutch levers in order to throw in or throw out the clutches. Because of the effort required in such cases, or on account of the sticking of clutches of even more moderate capacity, it may happen that a machine tender may be unable to throw in or throw out a clutch with the desired promptitude or at the critical time necessary to avoid interruption of machinery operations or to avert breakage of machinery or other disaster by continued operation of machinery after it should have been released from the power. It is therefore desirable to provide for operation of such clutches by application of motive power pursuant to the exercise of a controlling action or the performance by the machine tender of a starting action requiring only moderate effort.

A power operated clutch shifting mechanism of exceedingly practicable and efficient character, whereby power available in the machinery containing the clutch to be operated, or power derivable from any desired source, may be utilized and applied as required for the functions of throwing in or throwing out the clutch, with automatic release of the shifting mechanism from the power pursuant to performance of the shifting operation, is provided by this invention which further includes provision whereby the power is applied in such manner as to avoid forcing either the shifting mechanism or the clutch actuating mechanism beyond the forcing required for the shifting function.

One illustrative mechanism embodying the invention in what is now considered its preferred form is shown for example in the accompanying drawings. The invention will be described by reference thereto, and will be more particularly pointed out and defined in the appended claims.

In said drawings:

Fig. 2 is a side elevation of the machinery shown in Fig. 1.

Fig. 3 is a side elevation of certain elements included in the clutch shifting mechanism, comprising a rotatable or angularly movable member and a telescopic push bar operable thereby.

Fig. 4 is an enlarged view showing in front elevation and partially in section a relatively small duplex clutch mechanism which is a portion of the power operated mechanism for shifting the relatively larger clutch contained in the heavy duty power transmission mechanism.

Figure 1:
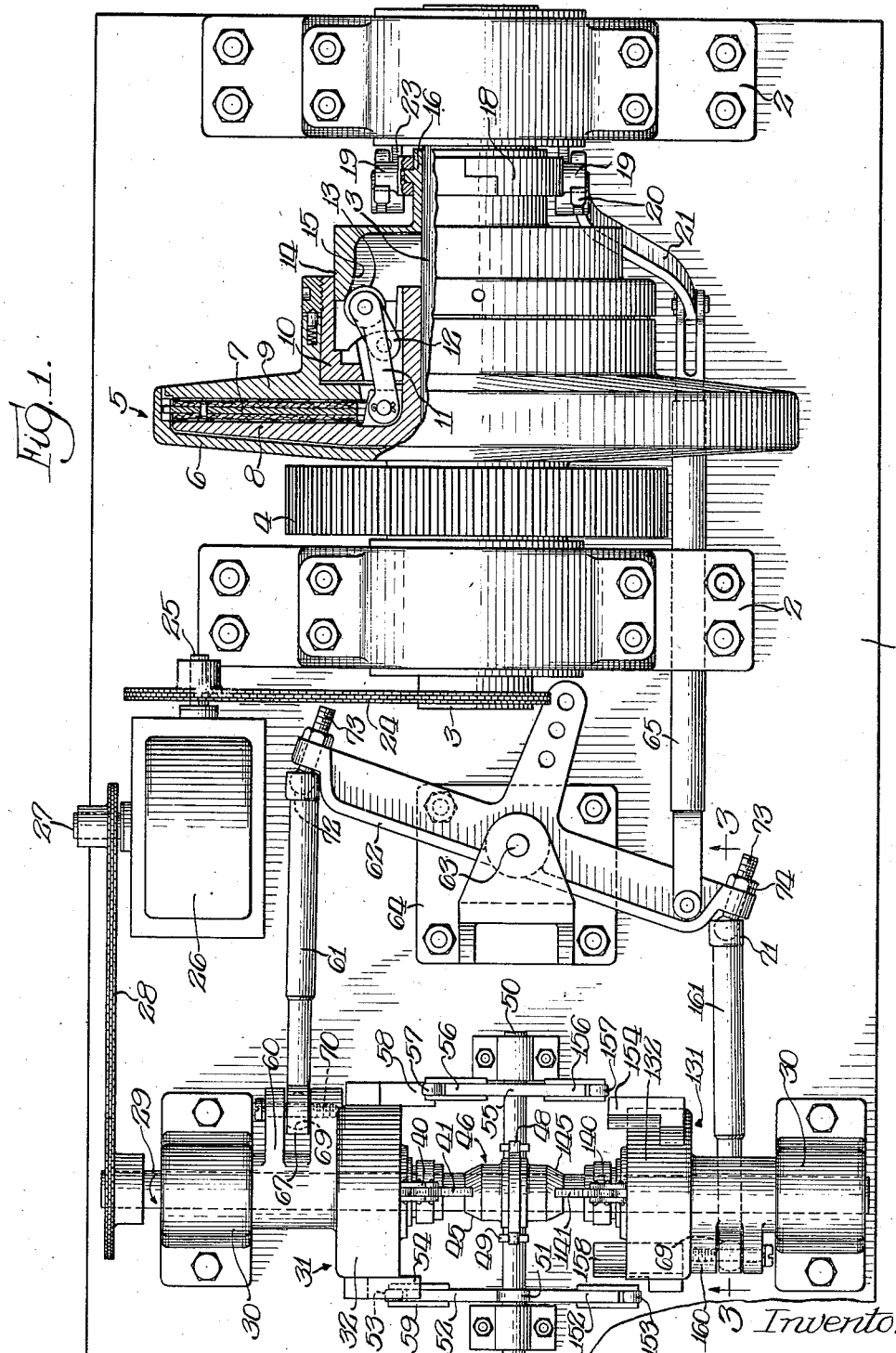
Fig. 1 is a top plan view of the illustrative clutch shifting mechanism with a portion of a heavy duty power transmission mechanism including a clutch operable by said shifting mechanism.

Figs. 5 to 10, inclusive, are diagrammatic views representing front elevations of the said duplex clutch mechanism in different positions of its controller or duplex clutch shifter, and illustrating a cycle of operations of said duplex clutch mechanism.

Figs. 11 to 16, inclusive, are diagrammatic views associated respectively with Figs. 5 to 10, each of said Figs. 11 to 16, inclusive, representing in full lines the left-hand clutch member of the duplex clutch mechanism and showing in dotted lines the position of certain lugs on the right-hand member of said mechanism. The position of the parts shown in Fig. 11 corresponds to the position of the parts shown in Fig. 5; and the succeeding Figs. 12 to 16, inclusive, show the parts in the positions corresponding respectively to Figs. 6 to 10.

Fig. 17 is a section taken on the line 17—17 of Fig. 4, looking in the direction of the arrows.

Fig. 18 is a diagram illustrating a cycle of operations of one crank arm operated by the small duplex clutch mechanism.

In the drawings, 1 denotes a machine bed on which are erected standards 2 supporting the bearings for a shaft 3. A portion of heavy duty power transmission mechanism is represented by the shaft 3, a gear 4 mounted for independent rotation on the shaft, and a large friction clutch for coupling said gear to the shaft, said large clutch being designated as a whole by the numeral 5. The gear 4 may be keyed to a sleeve loose on the shaft and integrally formed with the bell-shaped member 6 of the large clutch. The clutch selected for illustration is a friction disc clutch of the type disclosed in United States patent to Mosher and Van Derhoef, No. 1,883,394, of October 18, 1932, to which reference is made for a full explanation thereof. This particular clutch, as revealed by the portion shown in section in Fig. 1, comprises a friction disc 7 and a pair of disc clamping members 8 and 9. The friction disc is held by and in operative connection with the bell-shaped member 6. Clutch member 8 has its hub keyed to the shaft, and the coacting clutch member 9 is affixed to a carrier 10 slidable on the extended hub of the member 9. Normally the clutch members 8 and 9 are held separated a sufficient distance to release the friction disc by spring means not shown. The member 9 is forced toward the member 8, so as to clamp the interposed friction disc, by actuation of toggle mechanism comprising differential toggles. Each differential toggle, one of which is shown in Fig. 1, comprises long and short toggle arms 11 and 12 arranged at an acute angle, the long arm being pivotally connected to the clutch member 8 and the short arm pivotally connected to the carrier 10 between the pivot of the long arm and the toggle knuckle which has a roller 13. For application of power to cause the clutch members 8 and 9 to clamp the interposed friction disc, the differential toggles normally in the position shown in Fig. 1 are straightened or nearly straightened by forcing the toggle knuckles toward the shaft, which is accomplished by forcing inwardly a cup-shaped cam member 14 having an internal cam surface 15 to engage the toggle knuckle rollers. In other words, to establish clutching action, the cam member 14 is moved from the retracted position shown in Fig. 1 to a forward position. When the cam member is in its extreme forward position, the highest point of the cam surface 15 is immediately in advance of the vertical line of the centers of the knuckle rollers, as explained in said Mosher and Van Derhoef patent, so that the rollers bear on the cam surface just behind such highest point of the surface, locking the cam member in place and thus locking the clutch mechanism in its clutching position. This typifies a clutch mechanism to be forced to a self-locked position to establish clutching action and to be forced from such position for releasing the clutch. The cup-shaped cam member 14 is integral with a sleeve 16 slidable on the shaft, typifying an axially shiftable element of such mechanism and representing means to be forced through a certain distance from one certain position to another certain position and to be reversely shifted to its original position. Said sleeve 16 has swiveled thereto a clutch collar 18, whose opposite trunnions 19 are engaged by the yoke arms 20 of the clutch throw lever 21, which lever 21 typifies a shifting means to be reversely operated for effecting reverse shifting operations. The clutch throw lever 21 is shown fulcrumed at 22 on the bracket 23. In the drawings the large clutch is represented in the released or thrown out condition. In Figs. 1 and 2 the clutch throw lever 21 is shown in full lines in the position assumed when the clutch has been thrown out, while in Fig. 2 the position of said lever when the clutch has been thrown in is indicated in dotted lines.

The large clutch 5, a partial description of which has been given above for convenience, typifies any large clutch embodied in heavy duty power transmission machinery, or other clutch the shifting of which requires such an effort as to render use of the present invention desirable, and the shaft 3 and gear 4 typify any independently rotatable coaxial members or machine elements to be coupled and uncoupled by the use of such clutch. It may be assumed, for example, that the shaft 3 is driven by means not shown from an engine or any suitable source of power and transmits motion through the clutch and gear 4 to machinery to be driven; or it may be assumed that the shaft 3 is driven from a source of power through the gear and clutch and is to be equipped with means for driving machinery; or it may be assumed that clutch 5 is used for coupling adjacent ends of aligned shafts. Thus the major machinery embodying the clutch or mechanism to be shifted may be of various kinds.

Reference will now be made to the illustrated clutch shifting mechanism, which itself embodies a relatively small and easily operable clutch mechanism. Power for actuating the shifting mechanism may be derived from the machinery which includes the clutch to be shifted, or from any suitable source. For example, the shaft 3, assuming it to be a live shaft, may be utilized as the source of power for the clutch shifting mechanism. As shown in Figs. 1 and 2, the shaft 3 drives through the sprocket chain 24 the driving shaft 25 of a speed reducing mechanism contained in the gear box 26. This mechanism may be, for example, a worm gear mechanism, the driving shaft 25 thereof being a worm shaft and the driven shaft 27 thereof being a worm wheel shaft. Said shaft 27 drives through the sprocket chain 28 a shaft 29 typifying any motor-driven shaft utilized as the actuating means for the illustrative clutch shifting mechanism. Bearings for said shaft 29 are indicated at 30.

Shaft 29 is equipped with a duplex clutch mechanism comprising a pair of clutches, one designated as a whole by the numeral 31 and the other by the numeral 131. These are herein referred to as small clutches to distinguish from the relatively large clutch in the major mechanism. Said clutches 31 and 131 are in fact relatively small clutches or clutches of such character as to be susceptible of actuation with light effort or with an effort which is moderate as compared with that required for shifting the large clutch. These small clutches 31 and 131 may be friction clutches, jaw clutches or other suitable clutches. Friction clutches of the type operable by an axially shiftable clutch cone slidable on the clutch shaft are preferred. One suitable construction for a clutch of such type is shown in Fig. 4 wherein 32 designates a clutch member mounted for independent rotation on the clutch shaft 29. It is shown as a flanged or bell-shaped clutch member, the hub of which is loose on the shaft. Secured to the clutch shaft and in driving engagement therewith is a tubular member 33 formed with an annular jaw member 34 and having annular jaw members 35 and 36 slidable thereon. Between these jaw members are blocks 37 of wood or the like held by rings 38 which are slidably but non-rotatably secured in the flange of the clutch member 32, said clutch member having its flange internally provided with splines or ribs 39 engaging peripheral cross grooves in the rings 38. The jaw member 36 is connected by short links 40 to levers 41 pivoted at 42 to a ring or collar 43 mounted on a tubular member 44 attached to and extending from the clutch member 33. The free ends of the levers 41 are close to the clutch shaft and are adapted to be spread or forced outwardly by engagement with the conical surface 45 of the clutch cone 46 which is shown as a duplex clutch cone having a cylindrical intermediate portion and conical end portions 45 and 145. The effect of the spreading of the free ends of the levers 41 is to force the jaw member 36 toward the jaw member 34, thereby clamping the blocks 37 which are connected with the clutch member 32 through the rings 38. In Fig. 4 only the left-hand clutch 31 is shown partially in section to reveal its internal construction. The right-hand clutch 131 may be of identical construction. The clutch member of the right-hand clutch which is rotatably mounted on the clutch shaft is designated by the numeral 132. The levers for actuating the right-hand clutch are designated by the numeral 141, said levers 141 being connected by the short links 140 to an annular jaw member corresponding to the jaw member 36 of the left-hand clutch. The parts 143 and 144 of the right-hand clutch correspond to the parts 43 and 44 of the left-hand clutch.

Normally the two clutches 31 and 131 are in released condition, or in other words their clutch members 32 and 132 are released from driving connection with the shaft 29. These two clutches are to be utilized in alternation for transmitting power from said shaft. It is desirable to throw in and throw out these clutches in alternation by operation of a single controller or shifting means, and one practicable arrangement for this purpose involves the employment of a duplex clutch cone with shifting means presently to be described. The clutch cone is normally in the neutral position as shown in Fig. 4. When shifted from the neutral position to a left-hand position, the free ends of the levers 41 are spread by engagement with the conical surface 45, causing the clamping of the wooden blocks between the jaw members 34, 35 and 36, and thus clutching the clutch member 32 to the shaft. The movement of the clutch cone to the left is continued until the free ends of the levers 41 are brought into engagement with the cylindrical surface of the clutch cone, thus establishing the clutched condition of the left-hand clutch. To throw out said left-hand clutch, the clutch cone is shifted back to neutral position, thus releasing the levers 41 and consequently releasing the friction surfaces of the clutch from gripping engagement. To throw in the right-hand clutch, the clutch cone is shifted from the neutral position to the right until the free ends of the levers 141, having been spread by the right-hand conical surface 145, are brought into engagement with the cylindrical surface of the clutch cone, thus establishing the clutched condition of said right-hand clutch. To throw out the right-hand clutch, the clutch cone is again shifted from the right-hand position to the neutral position. The clutch cone 46, consisting of a sleeve slidable on the clutch shaft, is shown equipped with a clutch collar 47 swiveled thereto, the opposite trunnions 48 of the clutch collar being engaged by the slotted ends of a pair of lever arms 49 projecting from and rigidly secured to the shaft 50 of a manually operable shifting lever 51, the latter being also rigidly connected to said shaft 50. The hand lever 51, typifying a controller, normally stands in the neutral position shown in Fig. 4. It is shifted from such neutral position to the left to throw in or apply the left-hand clutch 31; is shifted from the left-hand position back to neutral position to throw out or release the left-hand clutch; is shifted from neutral position to the right to throw in or apply the right-hand clutch 131, and is shifted from right-hand position back to neutral position to throw out or release the right-hand clutch.

As shown in Fig. 4, the lever 51 is constructed with a pair of cross arms 52 and 152 which are equipped with rollers 53 and 153 for engaging certain lugs or abutments 54 and 154 on the clutch members 32 and 132. Rigidly attached to the shaft 50 is a substantially T-shaped arm 55 providing a pair of cross arms 56 and 156 which are equipped with rollers 57 and 157 to be engaged by certain other lugs or abutments 58 and 158 on said clutch members. Thus the duplex clutch shifting means, in the specific form embodied in the illustrative mechanism, is a lever structure having a plurality of cross arms, said lever structure as a whole comprising the manually operable lever 51, its shaft 50, the arms 49 on said shaft engaging the collar on the duplex clutch cone, the pair of cross arms 52 and 152 and the pair of cross arms 56 and 156. The function of the lugs 58 and 158 in coaction with the cross arms 56 and 156 is to accomplish automatic operation of the duplex clutch shifting means as required to throw out each of the small clutches 31 and 131 when a certain angular motion has been imparted to its normally released member. The purpose of the cross arms 52 and 152 in coaction with the lugs 54 and 154 is to accomplish certain motion limiting, locking and positioning functions as hereinafter explained. Each of the rollers 53, 153, 57, 157 may be arranged between and have its axle supported by a pair of small plates 59 riveted to the cross arm which carries such roller.

The duplex clutch mechanism above described is utilized for shifting the large clutch 5 through the agency of means such for example as represented in Figs. 1 to 3 and now to be described. As shown in said figures, the clutch member 32 is attached to or constructed with a crank arm 60. During actuation of said clutch member 32 by the shaft 29, throw of the crank arm 60 is transmitted by a push bar 61 to one end of an intermediately fulcrumed lever 62 pivoted at 63 to the fulcrum block 64 and operatively connected by the connecting rod 65 to the lever 21 for shifting the large clutch 5. The clutch member 132 is similarly attached to or constructed with a crank arm 160, and during actuation of said member 132 by said shaft 29 the throw of said crank arm 160 is transmitted by push bar 161 to the opposite end of said intermediately fulcrumed lever 62. By employing equal crank and rod connections between the opposite ends of the lever 62 and the clutch members 32 and 132, and by arranging the pivot or fulcrum of said lever 62 midway between its connections with the push bars, equal movements in opposite directions may be imparted to said lever 62 by actuation of the clutch members 32 and 132 through equal angles. It will be apparent that the lever 62, with its operative connections with the clutch members 32 and 132, and its operative connection through the rod 65 with the lever 21, exemplifies a means reversely operable by the respective small clutches 31 and 131, whereby power taken from the continuously driven shaft 29 through one of the small clutches is transmitted and applied in a manner to throw in the large clutch, and power taken from said shaft through the other of said small clutches is transmitted and applied in a manner to throw out the large clutch. The lever 62 may itself be considered as typifying a shifting means reversely operable by the two small clutches, its shifting function in this instance being performed by transmission of shifting force through the connecting rod 65 to the lever 21.

For reasons hereinafter indicated, it is desirable to construct the rods 61 and 161 as telescopic rods whereby they are capable of transmitting thrust but not operative for retractile purposes. Hence each crank arm operates the lever 62 in one direction only during throw of the crank arm toward said lever. On the other hand, as one crank arm is actuated from a certain initial position, such for example as shown in Fig. 3, through a certain angle to operate the lever 62 in one direction, the other crank arm will be reversely moved to its initial working position through its push rod connection with said lever. A suitable construction for one of the telescopic push rods is shown in Fig. 3, which represents a section taken on the line 3—3 of Fig. 1, looking in the direction of the arrows. As shown in Fig. 3, the push rod 161 is tubular and has slidably fitted therein a rod 66, the head 67 of which has the shoulder 68 bearing against the end of the tubular rod 161. Said head 67 is arranged between the two branches of the bifurcated crank arm 160 as shown in Fig. 1, there being sufficient clearance between the sides of said head and the crank arm branches to allow some lateral play. Said head 67 has an interiorly spherical socket which fits on a ball member 69. The bolt 70 passes through the two branches of the bifurcated crank arm and through the ball member 69, said bolt functioning as a wrist pin. It will be observed that the telescopic push bar 161 has such a connection with the crank arm 160 as to allow necessary universal motion as required by the motion of the lever 62, without undue strain on the wrist pin. The foregoing particularly describes the construction of the telescopic push bar 161 and its connection to its crank 160. It will be understood that the telescopic push bar 61 and its connection to its crank arm 60 may be of similar construction. The forward ends of the telescopic push bars have universal joint connections with the opposite ends of the lever 62. As shown, the said forward ends of said telescopic push bars are formed with socket members 71 engaging ball members 72 on screws 73 adjustably secured to the lever 62 and locked in desired adjustment by the lock nuts 74. In Fig. 3 a preferred construction is shown, the socket member 71 in that figure being mutilated to form a number of fingers 75 which are bent in engagement with the ball member 72.

By employing a construction such as described, including cranks to be clutched by the small clutches to the shaft 29 and telescopic push bars connecting said cranks with the opposite equal arms of the lever 62, it is possible to utilize power from the shaft in an advantageous manner for the shifting operations, to impart a definite shifting motion with precise accuracy at each operation, and to utilize motion of the shaft after accomplishment of the shifting function for effecting automatic throw out of the small clutch through which power for the shifting was transmitted. This will be more clearly understood by reference to the diagram shown in Fig. 18. In Fig. 18 let the line a—b represent the initial working position of the right-hand crank arm 160, the lugs 154 and 158 on the clutch member 132 being in the position shown with reference to said crank arm. The normal positions of the rollers 153 and 157 on the cross arms 152 and 156 of the duplex clutch shifting means are shown in full lines in this figure. Assume that the shifting means for the duplex clutch mechanism is moved from the neutral position shown in Fig. 4 to the right for throwing in the right-hand small clutch 131, thereby lowering the cross arm rollers 153 and 157 to the positions shown in dotted lines at 153$^x$ and 157$^x$. In the illustrative mechanism the shaft 29 rotates in a counter-clockwise direction as viewed in Figs. 17 and 18. Hence the throwing in of the right-hand small clutch will cause rotation of the clutch member 132 and crank 160 in a counterclockwise direction so as to impart a push through the telescopic push rod 161 to the lever 62 (Fig. 1), so as to operate said lever in a direction to effect the throwing in of the large clutch 5. As the crank arm moves from the position a—b to a dead center position a—c, throw of the crank arm is transmitted through the push rod, but after the crank arm passes the dead center position, the push rod on account of its telescopic character is incapable of transmitting further force or motion. Thus that part of the throw of the crank arm during its movement through a certain angle from the position a—b to the position a—c, is utilized for shifting purposes. It will be observed that the initial position of the crank arm is such that the motion imparted to the push rod is relatively rapid during motion of the crank arm through an angle of about 90°, and thereafter the motion imparted to the push rod decreases while the power applied thereto by the crank arm increases as the crank arm approaches the dead center position, thus furnishing the greater power as the resistance to the shifting operation or the throwing in of the large clutch increases. As the crank arm approaches the dead center position, the lugs 154 and 158 on the clutch member 132 revolve through the same angle, until the lug 158 encounters the cross arm roller 157. In the particular arrangement shown, the lugs are so positioned in relation to the crank arm that when the crank arm comes to the position indicated by the line a—d the lug 158 is at the position shown at 158$^a$, encountering the cross arm roller positioned at 157$^x$, the lug 154 having meanwhile moved to the position shown at 154$^a$. As the cross arm moves through the angle between the position a—d and the position a—e, the lug 158 moves from the position 158$^a$ to the position 158$^b$, thereby elevating the cross arm roller 157 from the position shown at 157$^x$ to its normal position shown in full lines, and thus restoring the shifting means of the duplex clutch mechanism to its neutral position shown in Fig. 4, and consequently throwing out the right-hand small clutch or releasing the clutch member 132 and its crank arm from the shaft. Thus in the illustrative mechanism a precisely accurate amount of motion is imparted for the shifting function as the crank arm moves through a definite angle to the dead center position, and power from the shaft after movement of the crank arm past the dead center position is utilized to effect actuation of the duplex clutch shifting means to throw out or release the working clutch of the duplex clutch mechanism. As the lug 158 comes to the position shown at 158$^b$, the lug 154 comes to the position shown at 154$^b$ in engagement with the cross arm roller 153, thus stopping movement by momentum of the now released clutch member 132, said clutch member being positively locked against continued rotation in the counterclockwise direction by engagement of its lugs 154 and 158, in the positions shown at 154$^b$ and 158$^b$, with the rollers 153 and 157 carried by cross arms which are at opposite sides of the shaft 29 and rigidly connected to the shaft 50 below the shaft 29 as seen in Fig. 17. In the operation as thus far described, the lever 62 (Fig. 1) has been moved from the extreme position shown in that figure to the opposite extreme position with the result that the lever 21 has been moved from the position shown in full lines in Fig. 2 to the position shown in dotted lines in Fig. 2, thus throwing in the large clutch 5. Since the clutch member 132 is now released from the shaft 29, the crank arm 160 by its own weight and the weight of its connections with the push rod 161 may move reversely from the position a—e to a position below its dead center position. As will be apparent by reference to Figs. 3 and 18, the arrangement of the crank arm is such that its own weight will tend to move it reversely from the position a—e, and if desired spring means could be employed to insure a reverse movement of the crank arm from the position a—e to a position below the dead center position, so that the crank arm can be reversely moved to its initial working position through its push rod connection with the lever 62 when the latter is next operated. In any event, before actuation of the opposite crank, a reverse adjustment of the released clutch member 132 so as to move the crank arm 160 below the dead center position will be accomplished by coaction of the cross arm roller 153 with the lug 154. Assume for example that by reason of tight fitting of parts the crank arm 160 should remain in the position a—e after the clutch member 132 has been released from the shaft. Now when the shifting means for the duplex clutch mechanism is moved from the neutral position shown in Fig. 4 to the left so as to throw in the left-hand small clutch 31, the effect will be to raise the cross arms associated with the right-hand small clutch, so that the cross arm rollers 153 and 157 in Fig. 18 will be raised to the position shown in dotted lines at 153ʸ and 157ʸ, whereby the cross arm roller 153 will move the lug 154 from the position shown at 154ᵇ to the position shown at 154ᵃ, thereby reversely adjusting the clutch member 132 so that the crank arm 160 is brought to the position a—d below the dead center position. Hence when the lever 62 (Fig. 1) is operated by power transmitted through the small clutch 31 to throw out the large clutch, said lever 62 in returning to the position shown in Fig. 1 will through the push rod 161 reversely move the crank arm 160 to its initial working position shown at a—b in Fig. 18.

Fig. 18 has been described as diagrammatically representing the series of operations which take place in connection with the right-hand small clutch 131. A like cycle of operations takes place with respect to the left-hand small clutch, and the diagram in Fig. 18 may be used to illustrate the operations with reference to the left-hand small clutch. For instance in Fig. 18, the line a—b may represent the initial working position of the crank arm 60 on the clutch member 32 (Fig. 1); the line a—e in Fig. 18 may represent the position to which said crank 60 is moved during the period while it is actuated by the shaft 29; the lugs shown in Fig. 18 may be considered as representing those on the clutch member 32 of the left-hand small clutch; and the cross arm rollers shown in Fig. 18 may be taken as representing those associated with the left-hand small clutch.

For further explanation of the mode of operation of the illustrative mechanism reference is made to Figs. 5 to 16. Figs. 5 to 10 are diagrammatic views representing in front elevation the duplex clutch mechanism and its shifting means in various positions, and Figs. 11 to 16 are diagrammatic views corresponding to Figs. 5 to 10 showing the angular positions of parts. In Figs. 11 to 16, parts associated with the left-hand clutch member 32 are represented in full lines, and parts associated with the right-hand clutch member 132 are indicated in dotted lines. In said Figs. 11 to 16, the crank arm 60 associated with the left-hand clutch is represented by a radial full line, and the crank arm 160 associated with the right-hand clutch is represented by a dotted radial line.

Fig. 5 represents the duplex clutch mechanism in the same position as that shown in Figs. 1, 2 and 3, which is the position assumed when the lever 62 has been actuated to the position shown in Fig. 1, with consequent actuation of the lever 21 to the position shown in full lines in Figs. 1 and 2, whereby the large clutch 5 has been thrown out. In attaining the position shown in Fig. 1, power has been transmitted through the left-hand clutch 31, the associated crank arm 60 of which has been actuated to the forward position shown in Figs. 1 and 11 while the other crank arm 160 of the right-hand small clutch has been reversely moved to its initial working position as shown in Figs. 1, 5 and 11. The duplex clutch shifter has been moved to its neutral position by the lug 58 coacting with the cross arm roller 57 as previously explained with reference to Fig. 18, and the cross arm roller 53 coacting with the lug 54 has stopped the counter-clockwise rotation of the clutch member 32 after its release by the throwing out of the left-hand clutch. Fig. 11 indicates the angular relationship of the two crank arms, the lugs 54 and 58 on the clutch member 32, and the lugs 154 and 158 on the right-hand clutch member 132, when the duplex clutch mechanism is in the position shown in Fig. 5.

To throw in the large clutch, the duplex clutch shifter is moved from the neutral position shown in Fig. 5 to the right-hand position shown in Fig. 6, thereby throwing in the right-hand small clutch, and during this movement of the duplex clutch shifter, if the left-hand clutch member 32 has not already been reversely moved by the weight of its crank to a position below the dead center position, the cross arm roller 53 by lifting the lug 54 on said clutch member 32 will automatically adjust said member, so that, as shown in Fig. 12, the crank arm 60 will be below the dead center position, i. e. in the position indicated at a—d in Fig. 18. Thus Figs. 6 and 12 indicate the positions of the parts when the duplex clutch shifter is just moved to its right-hand position, i. e. at the instant the right-hand clutch is thrown in. The effect of thus throwing in the right-hand clutch is to actuate the right-hand crank 160 from its initial working position, so that it will impart a push through its push rod 161 to the lever 62 (Fig. 1) for operating the lever 21 to throw in the large clutch 5.

Figs. 7 and 13 indicate the positions of the parts when the right-hand clutch member 132 has been actuated through such an angle that the right-hand crank arm 160 has reached the position shown at a—d in Fig. 18, bringing the lug 158 into engagement with the cross arm roller 157.

Figs. 8 and 14 indicate the positions of the parts at the instant when the right-hand crank arm 160, having been actuated past the dead center position, has been brought to the position shown at a—e in Fig. 18. The right-hand crank arm 160 in moving from its initial working position to the dead center position has through its push rod 161 actuated the lever 62 (Fig. 1) so as to effect throwing in of the large clutch 5, and in movement of said crank arm past the dead center position the lug 158 has lifted the cross arm roller 157 thereby moving the duplex clutch shifter to its neutral position and releasing the right-hand clutch. Meanwhile the lug 154 has come to the position shown in Figs. 8 and 14, in engagement with the cross arm roller 153 so that any continued movement by momentum of the clutch member 132 is prevented. It will be understood that the position of the parts shown in Figs. 8 and 14 is just the reverse of that shown in Figs. 1, 2, 4, 5 and 11, or in other words Figs. 8 and 14 show a condition with respect to the right-hand small clutch corresponding to that shown with respect to the left-hand small clutch in Figs. 2 and 11.

Figs. 9 and 15 represent the condition resulting when, after attainment of the positions shown in Figs. 8 and 14, the duplex clutch shifter is moved to its left-hand position to throw in the left-hand clutch. In this movement of the duplex clutch shifter to its left-hand position, the cross arm roller 153 coacting with the lug 154 causes an adjustment of the position of the right-hand clutch member 132 (if not already accomplished by the weight of the crank), so that the right hand crank arm 160 is moved below its dead center position. The effect of throwing in the left-hand clutch would be to cause the actuation of the left-hand crank 60 to the position shown in Fig. 1, with consequent throwing out of the large clutch 5, during which operation the released right-hand clutch member 132 and its crank arm are reversely moved to an initial working position by the lever 62 through the push rod 161.

Figs. 10 and 16 indicate the positions of the parts when the left-hand clutch member 32 has been actuated through such an angle that the lug 58 comes into engagement with the cross arm roller 57. The left-hand crank arm 60 is now in the position corresponding to the position a—d in Fig. 18. As the left-hand clutch member 32 continues its actuated motion, the lug 58 will lift the cross arm roller 57, thereby restoring the duplex clutch shifter to neutral position, so that the cross arm roller 53 is brought into coaction with the lug 54, and thus the parts are again brought to the position originally considered, namely the position indicated in Figs. 5 and 11.

From the foregoing it will be seen that the illustrative shifting mechanism imparts equal reverse shifting motions, the extent of motion imparted at every operation being always the same; that the greatest force is exerted by each of the two cranks as it approaches its dead center position, thus rendering the mechanism particularly advantageous for simultaneously shifting two large clutches in a duplex organization in which one of the large clutches is thrown in as the other is thrown out; that by virtue of the telescopic push rods the power for the shifting function is applied in such manner as to avoid forcing any of the mechanism after the shifting function is performed; that shifting means of the mechanism is automatically released from power pursuant to the performance of the shifting function; and that each of the cranks before actuation of the other is adjusted to such a position as to be reversely moved to its initial working position through its push rod connection with the lever 62 when said lever is actuated by the other crank.

It will be apparent that the lever 62 may be connected by an additional connecting rod with the clutch throw lever of another large clutch arranged to be thrown in as the clutch 5 is thrown out, or the clutch throw lever 21 of the large clutch 5 may be connected by a connecting rod with a similar clutch throw lever for another large clutch, or two large clutches similar to 5 may be arranged back to back on the same shaft and have their actuating cams 15 attached to the same clutch sleeve slidable on the shaft. When the invention is used for simultaneously shifting two large clutches one of which is thrown in as the other is thrown out, the advantage is obtained that the greatest force is applied in each operation when the resistance to the shifting is greatest, i. e. as the mechanism of one of the large clutches is forced to the locked clutched position.

Referring again to Fig. 18, it will be understood that as either crank is actuated from the position a—b to the dead center position a—c, the friction surfaces of the small clutch through which the crank is actuated are in tight gripping engagement, so that there is no partial release or capability of slippage in the clutch during the interval in which power should be applied for the shifting function; while after the shifting function has been performed, and no force is being transmitted through the push rod to the lever 62, the small clutch through which the power was transmitted is thrown out.

The connecting rod 65 may be connected to the levers 62 and 21 by universal joints, if desired, but in the majority of installations the length of the connecting rod will be such that it will be sufficient to pivotally connect said rod to the said levers, allowing sufficient looseness in the connections to accommodate the movement of said rod relative to each of said levers in planes transverse of the planes of motion of said rod about its respective pivots.

The illustrative mechanism, while primarily for the purpose of shifting a large clutch or clutches, may of course be used for other shifting purposes, for example for the shifting of large shiftable gearing or other purposes where at every operation it is desirable to shift a mechanism or a heavy object through a certain distance from one certain position to another and to reshift it back to its original position.

Obviously the illustrative mechanism may be variously modified in details of construction and arrangement to suit various different requirements and conditions; furthermore it is not indispensable that all of the features of the invention be used conjointly, since various features of the invention may be advantageously used in various different combinations and subcombinations.

What I claim as my invention and desire to secure by Letters Patent is:

1. In a power shifter, a shaft continuously driven in one direction from a source of power, a pair of normally released clutches on said shaft, means for throwing in said clutches in alternation, an intermediately fulcrumed lever, connections between said clutches and opposite arms of said lever whereby to operate said lever from the shaft through one clutch in one direction and through the other clutch in the opposite direction, a member of each clutch being reversely rotated by its connection with said lever when the latter is operated from said shaft through the other clutch, and means shiftable in opposite directions by said lever.

2. A power shifter comprising an actuating shaft having a pair of clutches, said clutches comprising clutch members normally released from said shaft and clutch means for clutching them to the shaft, clutch shifting means whereby the clutches in alternation can be thrown in, reversely operable shifting means operably connected with both of said clutch members in such manner as to be operable by one of them in one direction and by the other of them in opposite direction, and a pair of means respectively controlled by the angular position of said clutch members and cooperative with such clutch-shifting means whereby each of said clutch members when it has been actuated by the shaft through a given angular distance from its initial working position effects operation of such clutch shifting means to release such member, each of said members being returned to a certain initial working position by its connection with said reversely operable shifting means when the latter is operated by the other member.

3. A power shifter comprising an actuating shaft having a pair of clutches, said clutches comprising clutch members normally released from said shaft and clutch means for clutching them to the shaft, clutch shifting means whereby the clutches in alternation can be thrown in, reversely operable shifting means operably connected with both of said clutch members in such manner as to be operable by one of them in one direction and by the other of them in the opposite direction, means whereby a shaft-driven movement of either of said clutch members through a certain angular distance from its initial working position effects operation of clutch shifting means to release such member, said movement carrying such member to a position beyond that for imparting movement to said shifting means, and means for automatically reversely moving the member to a position such that it will be reversely moved to its initial working position by its connection with the shifting means when the latter is operated by the other member.

4. A power shifter comprising an actuating shaft having a pair of clutches, said clutches comprising clutch members normally released from the shaft and clutch means for connecting them to the shaft, shifting means operable from the shaft through one clutch in one direction and through the other clutch in the opposite direction, clutch shifting means normally in neutral position and operable for throwing in and out the clutches in alternation, said clutch shifting means comprising a lever having oppositely extending arms, and abutment means on said clutch members for coacting with said arms whereby to actuate said lever to effect release of each member pursuant to its actuation by the shaft through a given angle.

5. A power shifter comprising an actuating shaft having a pair of clutches, said clutches comprising clutch members normally released from the shaft and clutch means for connecting them to the shaft, shifting means operable from the shaft through one clutch in one direction and through the other clutch in the opposite direction, clutch shifting means normally in neutral position and operable for throwing in and out the clutches in alternation, said clutch shifting means having a plurality of arms, and abutments on said clutch members, certain of said abutments coacting with certain of said arms to actuate said clutch shifting means to effect release of each member pursuant to its actuation by the shaft through a given angle and certain of said arms cooperating with certain of said abutments to limit movement thereof when so released.

6. A power shifter comprising an actuating shaft having a duplex clutch mechanism, said mechanism comprising clutch members normally released from said shaft and clutch means for clutching them in alternation to the shaft, an intermediately fulcrumed lever, rod connections between said clutch members and opposite arms of said lever, said connections permitting said clutch members to be moved each from an initial working position through a certain angle past a dead center position, means operable by said members for operating said clutch means to release each member when it passes such dead center position, and means for automatically adjusting each member to such a position that it can be reversely moved to original position through its rod connection with said lever when the latter is operated by the other clutch member.

7. A power shifter comprising an actuating shaft having a duplex clutch mechanism, said mechanism comprising clutch members normally released from the shaft and clutch means for clutching them in alternation to the shaft, reversely operable shifting means, connections comprising telescopic push rods between said clutch members and shifting means, said shifting means being operable from the shaft through one of said clutch members in one direction and through the other of said clutch members in the opposite direction.

8. A power shifter comprising an actuating shaft having a duplex clutch mechanism, said mechanism comprising clutch members normally released from the shaft and clutch means for clutching them to the shaft, a shifter for said duplex clutch mechanism, said shifter being normally in a neutral position and operable therefrom one way to cause the clutching of one of said members and operable therefrom the other way to cause the clutching of the other of said members, means reversely operable from the shaft through the respective members for performing shifting functions in opposite directions, arms on said shifter, said shifter and arms being a rigid pivotally mounted lever structure and abutment means on said clutch members cooperable with said arms whereby the actuation of either of said members through a certain angular distance from its initial working position will cause the return of the clutch shifter to neutral position and consequent release of such member.

9. A power shifter comprising a pair of cranks, shifting means comprising a reversely movable member and telescopic push rods connecting said cranks with said member, said member being operated in one direction by one crank through its push rod and in the opposite direction by the other crank through its push rod, mechanism for actuating said cranks from a source of motive power including a pair of clutches arranged for transmitting torque through one clutch to actuate one crank in the direction for operating said member and through the other clutch to actuate the other crank in a direction for operating said member, both clutches being normally thrown out so that the cranks are released from the motive power, clutch-shifting means whereby the clutches in alternation can be thrown in and out, means for automatically operating clutch-shifting means to throw out the clutch for each crank when after operating said member it moves somewhat beyond a dead center position, and means for automatically adjusting the position of each crank before actuation of the other so that it will be reversely moved to its initial working position by said member when operated by the other crank.

10. A power shifter comprising a pair of cranks, shifting means comprising a reversely movable member and telescopic push rods connecting said cranks with said member, said member being operated in one direction by one crank through its push rod and in the opposite direction by the other crank through its push rod, mechanism for actuating said cranks from a source of motive power including a pair of clutches arranged for transmitting torque through one clutch to actuate one crank in the direction for operating said member and through the other clutch to actuate the other crank in a direction for operating said member, both clutches being normally thrown out so that the cranks are released from the motive power, clutch-shifting means whereby the clutches in alternation can be thrown in and out, and means for automatically operating clutch-shifting means to throw out the clutch for each crank when after operating said member it moves somewhat beyond a dead center position, the arrangement of the cranks and weight of the cranks and their connections in relation to such dead center position being such that each crank when free and unrestrained will be caused to assume a position so that it will be reversely moved to its initial working position by said member when operated by the other crank.

11. A power shifter comprising a pair of cranks, shifting means comprising a reversely movable member and telescopic push rods connecting said cranks with said member, said member being operated in one direction by one crank through its push rod and in the opposite direction by the other crank through its push rod, mechanism for actuating said cranks from a source of motive power including a pair of clutches arranged for transmitting torque through one clutch to actuate one crank in the direction for operating said member and through the other clutch to actuate the other crank in a direction for operating said member, both clutches being normally thrown out so that the cranks are released from the motive power, clutch-shifting means whereby the clutches in alternation can be thrown in and out, means for automatically operating clutch-shifting means to throw out the clutch for each crank when after operating said member it moves somewhat beyond a dead center position, and means whereby the throwing in of the clutch of one crank will cause or assure an adjustment of the other crank to a position from which it will be reversely moved by said member when next operated.

12. A power shifter comprising a pair of cranks, shifting means comprising a reversely movable member and telescopic push rods connecting said cranks with said member, said member being operated in one direction by one crank through its push rod and in the opposite direction by the other crank through its push rod, mechanism for actuating said cranks from a source of motive power including a pair of clutches arranged for transmitting torque through one clutch to actuate one crank in the direction for operating said member and through the other clutch to actuate the other crank in a direction for operating said member, both clutches being normally thrown out so that the cranks are released from the motive power, clutch-shifting means whereby the clutches in alternation can be thrown in and out, arms connected with said clutch-shifting means, and abutments connected with said cranks, certain of said abutments coacting with certain of said arms to cause operation of clutch-shifting means to throw out the clutch of each crank when after operating said member it moves somewhat beyond a dead center position, and certain of said arms and abutments cooperating to cause or assure adjustment of each crank to a position to be reversely moved by said member when the other crank is actuated.

13. A power shifter comprising a pair of cranks, shifting means comprising a reversely movable member and telescopic push rods connecting said cranks with said member, said member being operated in one direction by one crank through its push rod and in the opposite direction by the other crank through its push rod, mechanism for actuating said cranks from a source of motive power including a pair of clutches arranged for transmitting torque through one clutch to actuate one crank in the direction for operating said member and through the other clutch to actuate the other crank in a direction for operating said member, both clutches being normally thrown out so that the cranks are released from the motive power, clutch-shifting means whereby the clutches in alternation can be thrown in and out, said clutch-shifting means comprising a lever structure normally in neutral position and operable one way from neutral position to throw in one clutch and the opposite way from neutral position to throw in the other clutch, said lever structure having pairs of cross arms at opposite sides of the axis of the clutches and each crank having a pair of abutments movable therewith, the operation of each crank by its corresponding clutch causing one of its abutments to engage a cross arm and operate said clutch-shifting means to throw out such clutch when the crank after operating said member moves somewhat beyond a dead center position, while the other abutment of such crank will cooperate with another cross arm at the opposite side of the axis of the clutches to limit motion of such crank when so released and to cause or assure its adjustment to position to be reversely moved by said member when operated by the other crank.

14. A power shifter comprising a pair of cranks, actuating means therefor, said cranks being normally released from the actuating means, clutch mechanism for connecting the cranks in alternation with the actuating means, shiftable means, and telescopic push rods connecting said cranks with said shiftable means, the latter being operable in one direction by one crank through its push rod and in the opposite direction by the other crank through its push rod.

15. A power shifter comprising a pair of cranks, actuating means therefor, both cranks being normally released from the actuating means, clutches whereby the cranks in alternation can be connected with the actuating means, means for automatically throwing out each clutch pursuant to its transmission of a given angular motion to its crank, shifting means including a reversely movable member, connecting rods connecting said cranks to said member, the movement of each crank when actuated being from a certain initial position to a point beyond dead center position, the connections of the cranks to said member through said connecting rods permitting such movement beyond dead center position without transmission of motion through the connecting rods after the dead center position is passed, and means whereby the throwing in of the clutch of one crank causes the other crank to be reversely moved past said dead center position, said member being operated in one direction by one crank and in the opposite direction by the other crank and when operated by one crank reversely moving the other crank to its initial position.

16. A power shifter comprising an actuating shaft, a pair of members normally released from and to be alternately clutched to the shaft, clutch means for clutching said members in alternation to the shaft, pushing devices associated with the respective members, and shiftable means operable one way by one member through its pushing device and in the reverse way by the other member through its pushing device, each member imparting through its pushing device a push to said shiftable means only as the shaft drives said member through a certain angle.

17. A power shifter comprising an actuating shaft, a pair of members to be alternately clutched to the shaft, both of said members being normally released, clutch means for clutching said members in alternation to the shaft, pushing devices associated with the respective members, shiftable means operable one way by one member through its pushing device and in the reverse way by the other member through its pushing device, each member imparting through its pushing device a push to said shiftable means only as the shaft drives said member through a certain angle, means automatically controlling said clutch means to release each member when it has imparted its push, and means whereby each member before actuation of the other is automatically adjusted to position to be reversely moved to its initial working position by the shiftable means through the corresponding pushing device as the shiftable means is operated by the other member.

18. A power shifter comprising actuating means, a pair of rotatable members to be actuated in alternation, both members being normally released from the actuating means, clutches whereby said members in alternation can be connected with the actuating means, shifting means including a lever, means operatively connecting said members with said lever whereby said lever is operated in one direction by one member and in the opposite direction by the other member, one member being reversely operated through its connections with said lever when the other member is actuated by the actuating means, and means for automatically throwing out each clutch pursuant to its transmission of a given angular motion to the member associated therewith.

19. A power shifter comprising actuating means, a pair of rotatable members to be actuated in alternation, both members being normally released from the actuating means, clutches whereby said members in alternation can be connected with the actuating means, an intermediately fulcrumed lever, lineally movable operative connections between said members and opposite arms of said lever, and a shifting lever operated by said intermediately fulcrumed lever.

20. A power shifter comprising actuating means, a pair of rotatable members to be actuated in alternation, both members being normally released from the actuating means, clutches whereby said members in alternation can be connected with the actuating means, shifting means operable in one direction by one of said members and in the opposite direction by the other of said members, connections between said members and shifting means operative to transmit motion only during a limited angular movement of said members, means for automatically throwing out the clutch of each member when it has operated said shifting means, and means for automatically adjusting each member before actuation of the other to a position such that it can be reversely moved to its initial working position by its connection with said shifting means when the latter is next operated.

21. A power shifter comprising actuating means, mechanism including a pair of clutches for transmitting power two ways from the actuating means, shiftable means operable by said mechanism when the drive is through one clutch for shifting an object in one direction and reversely operable by said mechanism when the drive is through the other clutch for shifting such object in the opposite direction, a pair of controlling means respectively operable by the respective clutches, both of said clutches being normally released, and means manually operable to throw in said clutches in alternation and automatically operable by said controlling means to throw out each clutch pursuant to a given angular motion of the driven clutch member from a certain initial working position, the connections between the driven clutch members and said shiftable means being arranged so that the driven member of each clutch is reversely moved to its said certain initial working position by said shiftable means when the latter is operated by the other clutch.

22. A power shifter comprising actuating means, mechanism including a pair of clutches for transmitting power two ways from the actuating means, shiftable means operable by said mechanism when the drive is through one clutch for shifting an object in one direction and reversely operable by said mechanism when the drive is through the other clutch for shifting such object in the opposite direction, clutch-shifting means whereby to throw in and out said clutches in alternation, means whereby the operation of the clutch-shifting means to throw in either clutch will cause an angular adjustment of that member of the other clutch which is released from connection with the actuating means, and means whereby each clutch will automatically operate the clutch-shifting means to throw out such clutch pursuant to its operation of said shiftable means.

23. In combination with a friction clutch having clutch members to be frictionally engaged and mechanism operable to establish and disestablish clutched condition, said mechanism being self-locked in position establishing clutched condition and requiring an increased forced operation thereof after the clutch members are in contact for bringing it to such self-locked position, power-operated means for operating said mechanism including a crank arm through which the power is applied for operating said mechanism to establish clutched condition, said crank arm being normally disconnected from the source of power, clutch means for connecting said crank arm with the source of power, and means for automatically disconnecting said crank arm from said source, the final motion transmitted to said mechanism to force it to self-locked position being imparted by said crank arm as it comes to or approximates a dead center position, and means clutch-connectible with the source of power for reversely operating said mechanism.

24. In combination with a clutch, means for throwing in and out the clutch by power comprising a reversely operable clutch shifter, mechanism for reversely operating said clutch shifter, and means for connecting said mechanism with a source of power one way for operating it to throw in the clutch and another way to throw out the clutch, said mechanism including crank means through which the power is applied to the clutch shifter, said crank means arranged to transmit the least motion and to apply the greatest power to the clutch shifter in the last part of its operation.

25. A power shifter comprising an actuating shaft, a pair of members for transmitting torque from the shaft, both of said members being normally released from the shaft, clutch means for clutching said members in alternation to the shaft, means operable by said members for operating said clutch means to release each member when the shaft has actuated the same through a given angle, shifting means, and lineally movable means directly connecting said shifting means with said members for applying torque transmitted by one member as a shifting force to operate the shifting means one way and for applying torque transmitted by the other member as a shifting force for operating the shifting means reversely.

26. A power shifter comprising normally inoperative mechanism for transmitting power from a source of power two ways, and mechanism operable thereby to perform a shifting function in one direction when the power is transmitted one way and in the opposite direction when the power is transmitted the other way, said second named mechanism comprising reversely operable shifting means and means for applying the transmitted power thereo, said power applying means including motion-transmitting connections operative to transmit only a predetermined extent of motion to the shifting means, means for rendering the first named mechanism operative to transmit power in the way required for the shifting function to be performed, and automatic means for rendering said first named mechanism inoperative after transmission of said predtermined extent of motion to the shifting means.

27. A power shifter comprising normally inoperative mechanism for transmitting power from a source of power two ways, and mechanism operable thereby to perform a shifting function in one direction when the power is transmitted one way and in the opposite direction when the power is transmitted the other way, said second named mechanism comprising crank means and shifting means reversely operable by the first named mechanism through said crank means, each shifting operation involving actuation of crank means to and beyond a dead center position, the operative connections between said crank means and shifting means being incapable of transmitting motion after such dead center position is passed, means for rendering said first named mechanism operative to transmit power in the way required for the shifting function to be performed, and automatic means for rendering said first named mechanism inoperative after such dead center position is passed.

28. A power shifter comprising a pair of cranks, actuating means therefor, both cranks being normally released from the actuating means, mechanism for connecting said actuating means with the cranks in alternation, and shifting means reversibly operable by said cranks, each crank being reversely operated by its connection with said shifting means when the latter is operated by the other crank.

29. A power shifter comprising a pair of cranks, actuating means therefor, both cranks being normally released from the actuating means, mechanism for connecting said actuating means with the cranks in alternation, and shifting means reversibly operable by said cranks, each crank being reversely operated by its connection with said shifting means when the latter is operated by the other crank, said cranks arranged to transmit the least motion and to apply the greatest power to the shifting means in the last part of each operation thereof.

30. A power shifter comprising a pair of cranks, actuating means therefor, both cranks being normally released from the actuating means, mechanism for connecting said actuating means with the cranks in alternation, shifting means, and operative connections between said cranks and shifting means whereby the latter is operated in one direction by one crank and in the opposite direction by the other crank, said connections being operative to transmit throw of each crank to the shifting means only during motion of said crank to dead center position.

31. A power shifter comprising a pair of cranks, actuating means therefor, both cranks being normally released from the actuating means, mechanism for connecting said actuating means with the cranks in alternation, shifting means and operative connections between said cranks and shifting means whereby the latter is operated in one direction by one crank and in the opposite direction by the other crank, said connections being operative to transmit throw of each crank to the shifting means only during motion of said crank to dead center position, and means for automatically disconnecting each crank from the actuating means after it passes such dead center position.

32. A power shifter comprising a pair of cranks, actuating means therefor, both cranks being normally released from the actuating means, mechanism for connecting said actuating means with the cranks in alternation, shifting means, and operative connections between said cranks and shifting means whereby the latter is operated in one direction by one crank and in the opposite direction by the other crank, said connections being operative to transmit throw of each crank to the shifting means only during motion of said crank to dead center position, means for automatically disconnecting each crank from the actuating means after it passes such dead center position, and means whereby each crank before actuation of the other is adjusted to position to be reversely moved past such dead center position.

33. A power shifter comprising a pair of cranks, actuating means therefor, both cranks being normally released from the actuating means, mechanism for connecting said actuating means with the cranks in alternation, shifting means, push rod connections between said cranks and shifting means whereby the latter is operated in one direction by one crank and in the opposite direction by the other crank, said connections being operative to transmit throw of each crank to the shifting means only until such crank reaches a dead center position, means for automatically disconnecting each crank from the actuating means after it has passed such dead center position, and means whereby each crank before actuation of the other is adjusted to position to be reversely moved by its push rod connection with the shifting means.

34. A power shifter comprising a pair of cranks, actuating means therefor, both cranks being normally disconnected from the actuating means, clutches whereby said cranks in alternation can be connected with the actuating means, shifting means, telescopic push rods connecting the cranks with the shifting means, the working motion of each crank being through a certain angle to a dead center position, means for automatically throwing out the clutch of each crank after it has imparted its working movement through its push rod, and means whereby each crank before actuation of the other is adjusted to position to be reversely moved by its push rod connection with the shifting means.

35. A power shifter comprising a pair of cranks, actuating means therefor, both cranks being normally disconnected from the actuating means, clutches whereby said cranks in alternation can be connected with the actuating means, an intermediately fulcrumed lever, telescopic push rods connecting said cranks with opposite arms of said lever, said lever being operated in one direction by a push imparted by one crank through its push rod and in the opposite direction by a push imparted by the other crank through its push rod, the push from each crank being imparted during motion of the crank from a certain initial position to a dead center position, means for automatically throwing out the clutch of each crank when it has imparted its push, and means whereby each crank before actuation of the other is adjusted to position to be reversely moved by its push rod connection with said lever.

36. A power shifter comprising a power driven shaft, a pair of cranks loose on the shaft, clutch mechanism for clutching said cranks in alternation to the shaft, shifting means reversely operable by said cranks, means for automatically declutching each crank, the shaft-actuated motion of each crank being through a certain angle to and past a dead center position, the operative connections between said cranks and shifting means being incapable of transmitting motion after passing such dead center position, and means whereby each crank before actuation of the other is adjusted to position to be reversely moved through its connection with the shifting means.

37. A power shifter comprising a pair of rotatable members, actuating means therefor, both members being normally released from the actuating means, mechanism for connecting said actuating means with said members in alternation, means controlled by the angular motion of said members and driven by the actuating means for effecting automatic release of each member when it has been actuated through a given angle from a certain initial operative position, and shifting means reversely operable by said members, the connections between said shifting means and members automatically restoring each member to its said initial operative position when the shifting means is operated by the other member.

38. A power shifter comprising an actuating shaft, a pair of members normally released from and to be alternately clutched to the shaft, clutch means for clutching said members in alternation to the shaft, shifting means, means for transmitting motion from each of said members to the shifting means during action of such member from a certain angular position to another certain angular position, the shifting means being operable in one direction by one of said members, and means operable by said members independently of said shifting means for automatically operating said clutch means to release each member when it has moved past a position for imparting movement to the shifting means.

39. A power shifter comprising an actuating shaft, a pair of members normally released from and to be alternately clutched to the shaft, clutch means for clutching said members in alternation to the shaft, shifting means, means for transmitting motion from each of said members to the shifting means during actuation of such member from a certain angular position to another certain angular position, the shifting means being operable in one direction by one of said members and in the opposite direction by the other of said members, means for automatically operating said clutch means to release each member when it has moved past a position for imparting movement to the shifting means, and means for automatically adjusting the position of each member after its release from the actuating shaft.

40. A power shifter comprising an actuating shaft, a pair of members normally released from and to be alternately clutched to the shaft, clutch means for clutching said members in alternation to the shaft, an intermediately fulcrumed lever, and lineally movable means operatively connecting said members with opposite arms of said lever, whereby said lever is operated from the shaft in one direction through one of said members and each of said members is reversely rotated by its operative connection with said lever when the latter is operated by the other member.

41. A power shifter comprising a pair of crank, actuating means therefor, both cranks being normally released from the actuating means, mechanism for connecting said actuating means with the cranks in alternation, shifting means reversely operable by said cranks, each crank being reversely operated by its connection with said shifting means when the latter is operated by the other crank, and a controller for said mechanism comprising a lever structure normally in neutral position and operable one way from neutral position to connect the actuating means with one of said cranks and operable the other way from neutral position to connect the actuating means with the other of said cranks, said lever structure having oppositely disposed pairs of cross arms and each crank having a pair of abutments movable therewith, the operation of each crank by the actuating means causing one of its abutments to engage a cross arm and operate said lever structure to disconnect such crank from the actuating means, while another cross arm of said lever structure will cooperate with the other abutment of such crank to limit its motion when so released and to cause or assure a reverse adjusting movement thereof when the lever structure is operated to connect the actuating means with the other crank.

42. A power shifter comprising an actuating shaft having a duplex clutch mechanism, said mechanism comprising a pair of clutch members normally released from said shaft and clutch means for clutching them in alternation to the shaft, shifting means reversely operable by the respective members, sets of abutments movable with the respective members, each set comprising a pair of abutments, and a controller for said clutch means comprising a lever structure having pairs of cross arms at opposite sides of the axis of the shaft, the operation of each of said clutch members by the shaft causing one of its abutments to engage a cross arm and operate said lever structure to de-clutch such member, while another cross arm at the opposite side of said axis will cooperate with the other abutment of such member to limit its motion when so released and to cause or assure a reverse adjusting movement thereof when the lever structure is operated to connect the actuating means with the other member.

43. A power shifter comprising a pair of cranks, actuating means therefor, both cranks being normally released from the actuating means, clutch means for connecting the actuating means with the cranks in alternation, shifting means and connections between said cranks and shifting means whereby the latter is operated in one direction by one crank and in the opposite direction by the other crank, said connections having lost motion provision whereby each connection is capable of transmitting motion to the shifting means only during actuation of the corresponding crank from an initial working position to a dead center position, and means for automatically declutching each crank from the actuating means after its has passed such dead center position, the arrangement of said cranks and connections being such that their weight will cause each crank when so de-clutched to move reversely past such dead center position so that it will be restored to initial working position by the shifting means when its shifting means is operated by the other crank.

44. A power shifter comprising a pair of cranks, actuating means therefor, both cranks being normally released from the actuating means, clutch means for connecting the actuating means with the cranks in alternation, shifting means and connections between said cranks and shifting means whereby the latter is operated in one direction by one crank and in the opposite direction by the other crank, said connections having lost motion provision whereby each connection is capable of transmitting motion to the shifting means only during actuation of the corresponding crank from an initial working position to a dead center position, means for automatically declutching each crank from the actuating means after it has passed such dead center position, and means whereby the operation of said clutch means to connect the actuating means with either crank will cause or assure a reverse movement of the other crank past such dead center position, so that the shifting means when operated by one crank will return the other crank to its initial working position.

ALEXANDER T. BODLE.